United States Patent [19]

Orcutt

[11] Patent Number: 4,612,046

[45] Date of Patent: Sep. 16, 1986

[54] INSULATING AND SLAG INDUCING COMPOSITION AND METHOD FOR MOLTEN METAL CONTACT

[75] Inventor: Donald R. Orcutt, Hanover Park, Ill.

[73] Assignee: The Babcock & Wilcox Company, New Orleans, La.

[21] Appl. No.: 753,500

[22] Filed: Jul. 10, 1985

[51] Int. Cl.⁴ ............................................... C22B 9/00
[52] U.S. Cl. ........................................... 75/96; 75/24; 75/53; 75/257
[58] Field of Search .................... 75/96, 24, 3, 257, 53

[56] References Cited

U.S. PATENT DOCUMENTS 4,381,251  4/1983  Kitayama ................................ 75/96

*Primary Examiner*—Peter D. Rosenberg
*Attorney, Agent, or Firm*—Robert J. Edwards; Robert C. Mai

[57] ABSTRACT

An insulating and slag inducing composition comprising a mixture of Kaolite aggregate and appropriate amorphous quenched slag. The mixture is applied to the exposed surface of molten metal to induce slag formation and thermally insulate the molten metal.

3 Claims, No Drawings

INSULATING AND SLAG INDUCING COMPOSITION AND METHOD FOR MOLTEN METAL CONTACT

BACKGROUND OF THE INVENTION

This invention relates to a composition or mix and method for insulating and inducing slag formation in contact with molten metal, particularly in the manufacture of iron and steel and, more particularly, to an insulating and slag inducing mix which is cast or spread over the surface of the molten metal to form a layer of slag that acts as a refractory thermal insulation and prevents oxidation of the metal by the surrounding atmosphere.

In steelmaking and other molten metal processes, a layer of slag on the upper surface of the molten metal prevents both oxidation and excessive heat loss. The slag is formed by the selective oxidation and combination of various impurities (for example, in a charge of blast-furnace iron, scrap iron and other added materials) and causes separation of the material components into desired compositions of steel and slag.

Various materials have been used or proposed as additives to form an insulating slag cover for molten metal in steelmaking furnaces. In steelmaking processes, ferrous blast furnace slag has been used as an inexpensive slag inducer to form a layer over the molten metal in basic oxygen or electric arc furnaces. Ferrous slag, however, releases sulfur compounds which cause pollution of the atmosphere. Ferrous slag addition, moreover, creates a thicker than usual layer of slag that increases refractory wear and, in addition, promotes the formation of undesirable sticky or viscous slag. Viscous slag, as has been long known, hinders the rapid transfer of oxygen to the molten metal mass and causes the undesirable build-up of oxygen in the slag in the form of iron oxides.

Mixes of sand and silica have been used as inexpensive fillers but silica can create excessive amounts of slag as well as sticky slag formations and can contaminate the molten metal. Pitch or tar has also been blended with such mixes to provide a less expensive slag inducer. However, the carbon content of pitch and tar gives rise to fire safety and contamination problems. In order to reduce slag formation, aluminum oxide or alimina can be added to the mix. Free or nonfused aluminum oxide, however, has a tendency to plug the furnace orifices and causes undesirable bridging.

Thus, it is apparent that satisfactory slag and slag inducer compositions must have good chemical and thermal stability while in contact with the molten metal and must neither be subject to overly rapid breakdown or excessive slag formation, if contamination of the molten steel as well as air polluting gas formations are to be avoided. Furthermore, as in most industrial processes, it is important that materials selected for inducing slag formation be chosen on the basis of cost effectiveness.

SUMMARY OF THE INVENTION

The invention encompasses a novel method for treating molten metal that comprises applying to the surface of the molten metal a novel mixture of materials which insulates the metal and induces desirable slag formation with minimal contamination of the molten metal and minimal formation of atmospheric pollutants.

The mix comprises a blend of Kaolite (a registered trademark of the Babcock & Wilcox Company) aggregate and amorphous quenched slag. The Kaolite aggregate (available from The Babcock & Wilcox Company's Insulating Products Division, Augusta, Ga.) which is used in the composition and process described herein, is an insulating refractory which has been fired between 2540° F. (1393° C.) and 2570° F. (1410° C.). Advantageously, these fired and quenched components do not break down or react rapidly with the metal. The mix, therefore, provides the desired insulating and refractory properties to prevent excessive heat loss and does not result in the excessive formation of slag that is characteristic of ferrous slags that are mixed with the additives mentioned heretofore.

In accordance with the preferred embodiments of the invention, the method and mix are used in steelmaking, and the insulating and slag inducing mix comprises from about 40 to 50 percent by volume of the Kaolite aggregate and about 50 to 60 percent by volume of an amorphous quenched slag which is produced by quenching a blast-furnace slag.

In accordance with the invention, the method of treating a molten metal which includes applying to the exposed surface of molten metal a mix of Kaolite aggregate and amorphous quenched slat. The mix is cast or spread out directly onto the top surface of the molten metal. The mix can be applied by shoveling, throwing bags of the mix onto the surface, or by using machine means to cast or spread the mix.

The process can be used in steel making procedures utilized from blast furnace to the electric arc furnaces, basic oxygen furnaces or open hearth furnaces.

DETAILED DESCRIPTION

By mixing Kaolite aggregate and amorphous quenched slag, a composition is provided that has no free silica, calcia or alumina. The Kaolite material has the approximate chemical analysis (ASTM C 573-70) shown in Table I.

TABLE I

| KAOLITE ANALYSIS | | |
|---|---|---|
| Constituent | | Concentration-Weight Percent |
| Alumina | $Al_2O_3$ | 39.0 |
| Silica | $SiO_2$ | 44.0 |
| Ferric Oxide | $Fe_2O_3$ | 0.7 |
| Titanium Oxide | $TiO_2$ | 1.1 |
| Calcia | $CaO$ | 14.7 |
| Magnesium Oxide | $MgO$ | 0.1 |
| Alkalies, as | $Na_2O$ | 0.4 |

The fused state of the Kaolite material prevents free or nonfused silica from forming too much slag or a sticky slag. With no free alumina, the material does not plug furnace orifices. The calcia acts as a flux to reduce the refractoriness of the anorthite grain and to induce slag formation.

The amorphous quenched slag is obtained by air or water-quenching of molten blast-furnace slag through processes such as are disclosed in U.S. Pat. No. 3,508,660, U.S. Pat. No. 4,127,399, or U.S. Pat. No. 4,352,764, the disclosures of which are incorporated herein by reference. The amorphous quenched slag contains calcia, silica and alumina in a glassy state. The ratio of these components is different from the anorthite grain, thus making it less refractory. The glassy state prevents the formation of excessive amounts of sticky slag, bridging, or the plugging of furnace orifices. Also, undesirable sulfur compounds are driven off in the process of forming a quenched amorphous slag. Therefore, this composition does not cause atmospheric pollution or contaminate the molten metal product with sulphur or carbon.

In accordance with the invention, there is utilized a preferred mix of 60 percent by volume amorphous slag and 40 percent by volume Kaolite aggregate having the chemical analysis shown in Table II.

TABLE II

PREFERRED MIX ANALYSIS

|  | Amorphous Quenched Slag Weight Percent | 60/40 Mix Weight Percent | Kaolite Aggregate Weight Percent |
|---|---|---|---|
| Loss On Ignition | 0.21 | 0.68 | 0.20 |
| $SiO_2$ | 37.7 | 39.4 | 43.4 |
| $Al_2O_3$ | 9.76 | 17.0 | 38.0 |
| $TiO_2$ | 0.76 | 0.88 | 1.48 |
| $Fe_2O_3$ | 2.65 | 1.91 | 0.65 |
| CaO | 46.0 | 37.8 | 15.8 |
| MgO | 1.36 | 0.95 | 0.10 |
| $Na_2O$ | 0.33 | 0.25 | 0.03 |
| $K_2O$ | 0.42 | 0.41 | 0.33 |
| MnO | 0.55 | 0.46 | — |
| Density-lb/cu ft (g/cc) | 80.8 (1.30) | 72.5 (1.16) | 32.8 (0.53) |

The particle size of the amorphous quenched slag, Kaolite aggregate and preferred mix, classified by standard Tyler mesh screen scale size, is illustrated in Table III.

TABLE III

PARTICLE SIZE DISTRIBUTION

| SCREEN | Amorphous Quenched Slag Weight Percent | 60/40 Mix Weight Percent | Kaolite Aggregate Weight Percent |
|---|---|---|---|
| 4 Mesh | 1.35 | 2.31 | 1.9 |
| 6 Mesh | 2.43 | 3.96 | 4.02 |
| 8 Mesh | 4.10 | 6.88 | 9.87 |
| 10 Mesh | 8.66 | 14.14 | 15.25 |
| 14 Mesh | 18.93 | 27.41 | 21.23 |
| 20 Mesh | 34.09 | 43.17 | 26.28 |
| Thru 20 Mesh | 65.91 | 56.83 | 73.72 |
| Total | 100.00 | 100.00 | 100.00 |

A 50–50 mix of the amorphous quenched slag and Kaolite aggregate has also provided satisfactory performance. A trial run of the 50–50 mix using 400 pounds of the inventive composition yielded performance results comparable to a 600 pound run of a standard product and maintained melt temperature 20° F. hotter.

The inventive composition advantageously includes no organics which can cause atmospheric pollution, contamination of the molten metal or fire safety problems. The absence of free silica precludes sticky slag formation, as well as health hazzards from air borne silica. The absence of free alunina prevents the propagation of furnace orifice blockage, and there is no free calcia to cause excessive slag formation and refractory fluxing. Since the mix is thermally efficient, it maintains a more consistent melt temperature for longer periods of time. The mix achieves a good angle of repose for optimum weight to volume spreadability. The ratio of the components may be varied for different melt temperatures to obtain optimum metal composition. By varying the ratio of Kaolite aggregate to the amorphous quenched slag, the refractoriness of the mix can be changed to meet the needs of the molten metal, for example, pig iron charges require lower refractoriness than scrap steel.

The composition of the molten slag layer that is formed in steelmaking will vary depending on whether or not the slag is formed in connection with a pig iron or scrap steel charge. There may be no slag layer at all in an electric arc furnace. The typical thickness of the slag layer, therefore, will vary from zero for electric arc furnaces, to a range of 4 inches (101.6 mm) to 8 inches (203.2 mm) in pig iron charged applications, and 6 inches (152.4 mm) to 10 inches (254 mm) in scrap metal charged applications. The composition of the slag inducing mix will vary depending upon the application, metal temperature and the thickness of the desired slag layer.

While use of the mix has particular feasability in connection with its application to iron and steel, those skilled in the art will recognize that similar mixes can also be useful in non-ferrous metal applications. Thus, the mix of Kaolite aggregate and appropriate amorphous quenched slag could be employed in molten aluminum, copper or brass manufacturing operations. In such cases, the amorphous quenched slag would be formed of a noncontaminating material and not from pig iron produced by a blast furnace for iron and steel making.

The embodiment of the invention in which an exclusive claim or privilege is claimed are defined as follows:

1. An insulating and slag inducing composition for molten metal contact comprising a mixture of Kaolite aggregate and amorphous quenched slag wherein the Kaolite aggregate has an approximate chemical analysis by weight of:

| $SiO_2$ | 43.4% |
|---|---|
| $Al_2O_3$ | 38.0% |
| $TiO_2$ | 1.48% |
| $Fe_2O_3$ | 0.65% |
| CaO | 15.8% |
| MgO | 0.10% |
| $Na_2O$ | 0.03% |
| $K_2O$ | 0.33% | and the amorphous quenched slag has an approximate chemical analysis by weight of:

| $SiO_2$ | 37.70% |
|---|---|
| $Al_2O_3$ | 9.76% |
| $TiO_2$ | 0.76% |
| $Fe_2O_5$ | 2.65% |
| CaO | 46.0% |
| MgO | 1.36% |
| $Na_2O$ | 0.33% |
| $K_2O$ | 0.42% |
| MnO | 0.55% |

2. An insulating and slag inducing composition according to claim 1 comprising from about 40 to 50 percent by volume of the Kaolite aggregate and about 50 to 60 percent by volume of the amorphous quenched slag.

3. The insulating and slag inducing composition of claim 1 wherein the composition is applied to the surface of the molten metal.

* * * * *